United States Patent Office 3,534,389
Patented Oct. 13, 1970

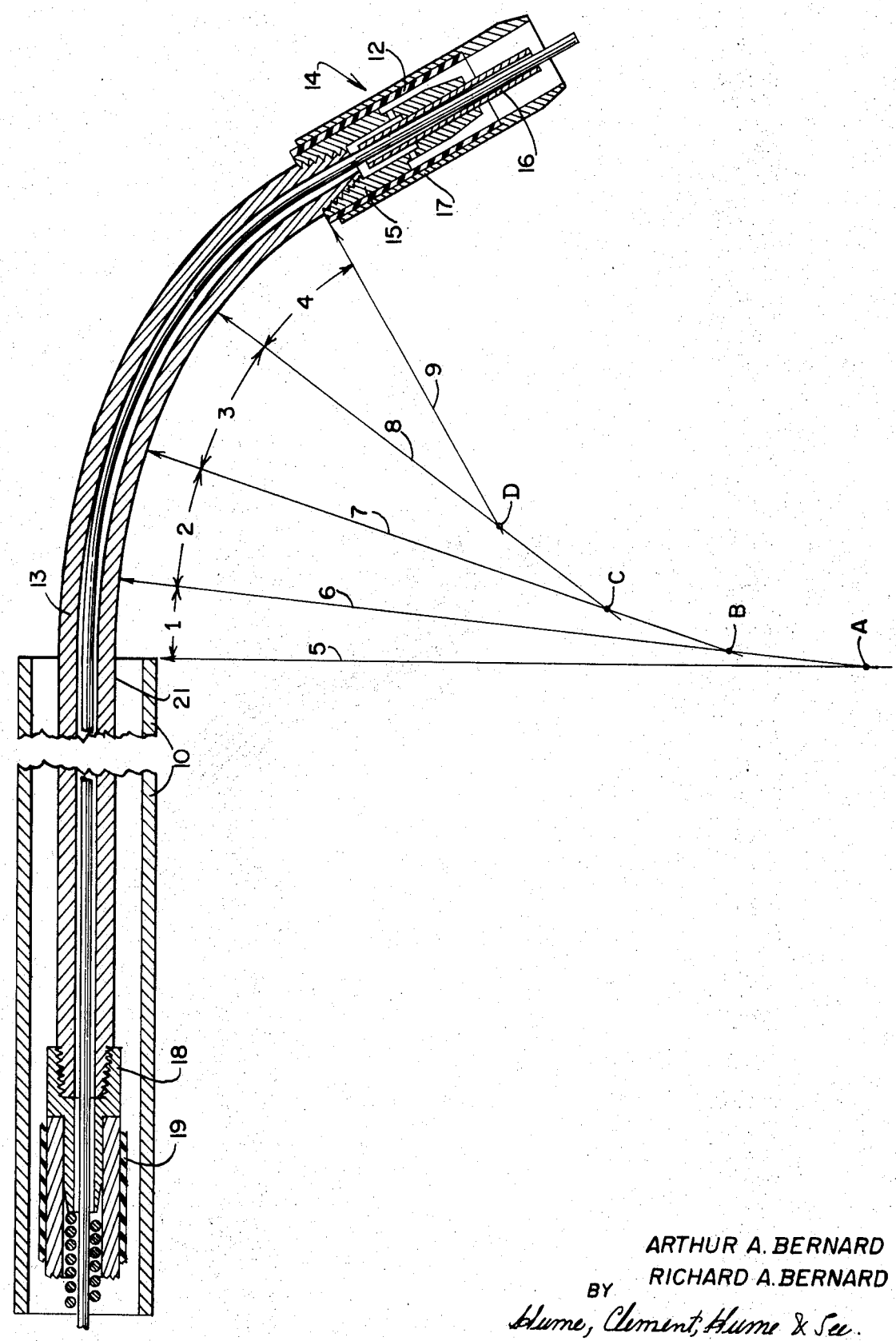

3,534,389
GOOSENECK TYPE ARC WELDING GUN
Arthur A. Bernard, Beecher, and Richard A. Bernard, Flossmoor, Ill., assignors to Bernard Welding Equipment Company, Beecher, Ill., a corporation of Illinois
Filed Dec. 4, 1968, Ser. No. 780,977
Int. Cl. B23k 9/00
U.S. Cl. 219—130                                    5 Claims

ABSTRACT OF THE DISCLOSURE

A gooseneck type arc welding gun in which the radii of curvature defining the curved portion of the gooseneck progressively diminish from the upstream end of the curved portion to the downstream end thereof, thereby facilitating ease of feed of continuous electrode through the gooseneck, yet imparting a sufficient curvature to the continuous electrode being fed therethrough to assure efficient electrical contact between the electrode and the welding current contact tip as the electrode passes through the straight bore of the current contact tip.

This invention relates to arc welding guns used for applying continuous lengths of consumable electrode mechanically fed to and through the guns to the welding arc and, more particularly, to improvements to that portion of an arc welding gun which is commonly called the gooseneck portion. Although this invention is valuable for depositing electrodes $3/32$ inch in diameter and smaller, it was primarily developed for applying electrodes larger than $3/32$ inch diameter because, heretofore, no gooseneck type gun was available for handling this range of larger electrode sizes.

To understand the full value and importance of this invention, it is important to first understand why, heretofore, continuous lengths of electrode larger than $3/32$ inch diameter had to be deposited by a type of welding gun commonly called the pistol grip type and why the gooseneck type was limited to the range of sizes $3/32$ inch and smaller. It is also important to understand the reasons why a gooseneck type gun is preferred for applying all sizes of electrode—including sizes larger than $3/32$ inch diameter.

A pistol grip type gun is so named because it looks and is shaped quite like a firearm pistol. It has a straight barrel with a flexible electrode conduit connected to the top end of the barrel with the bore of the conduit in line with the bore through the barrel. At the arc end of the barrel, there is a head portion to which the welding current contact tip is connected. Therefore, the only curvatures in the total electrode conducting system between the feed rolls at the electrode feeding machine to the welding arc are the curvatures in the flexible conduit. The flexibility of the conduit is made purposely limited so that the radii of curvature of the conduit will be large enough not to seriously restrict the passage of the larger sizes of electrode therethrough. To provide this straight passage for the electrode through the pistol grip type gun, the handle is connected to the side of the barrel at about a 60° angle in relation to the axis of the barrel so that, when gripped, the barrel is aimed toward the workpiece at about a 30° angle.

In the design of gooseneck type arc welding guns available heretofore, the flexible electrode conduit is connected to what is commonly called the gooseneck portion at a point within the handle of the gun. Extending forwardly from within the handle, the goosencek portion is curved downward to produce a curvature of about 60° with a single radius of about 4 inches. It is important to understand that, when the starting end of a new coil of electrode is threaded through the curvature of a conventional gooseneck type gun, it is curved to the radius of the gooseneck within the first few degrees of the 60° curvature. It has been established by extensive research that, regardless of the horsepower of electrode feeding machines, sufficient traction cannot be applied to the larger size of electrode to bend and push the first $3/4$ inch or so of the starting end of the electrode into the starting end of the 60° curvature when the curvature is no more than a 4 inch radius. If the radius could be more than 4 inches, as for example a 7 inch radius for a $1/8$ inch diameter electrode, an 8 inch radius for a $5/32$ inch diameter electrode, and about a 9 inch radius for a $3/16$ inch diameter electrode, electrode feeding machines in current use could provide sufficient traction to push the starting ends of these larger sizes of electrode into these sizes of radii. Yet, heretofore, the radius has been limited to about 4 inches for an important reason: due to a spring-back, as the electrode leaves the 60° radius gooseneck curvature, it has about a 5 inch or a 6 inch radius of curvature which provides the required spring value for making efficient welding current contact between the welding current contact tip and the electrode as the electrode tries to restraighten as it is fed through the straight bore of the welding current contact tip.

Thus, there have been competing considerations in the design of gooseneck type arc welding guns. To insure efficient welding current contact with the electrode, the curvature in the electrode should be produced by a gooseneck radius of about 4 inches. Yet the radius of the gooseneck should be not less than 7 or 8 inches to make it possible for the starting end of a $1/8$ inch diameter electrode to enter the curvature. In conventional gooseneck type welding guns, the first consideration has prevailed over the latter with the result that conventional gooseneck type guns have been limited to handling electrodes of $3/32$ inch diameter and smaller.

To still further understand the value of this present invention, it is important to recognize that if the length of the welding current contact tip is increased, the radius of the electrode fed into the bore of the contact tip can, in turn, be increased. However, increasing the length of the contact tip so as to make it possible to increase the radius of the gooseneck results in discarding longer length contact tips as the tips wear out, and longer length tips cost the user more than shorter length tips.

The main reason welding operators prefer using gooseneck type guns is that pistol grip type guns are very top-heavy. The reason for this is that in pistol grip type guns, the electrode conduit extends up beyond the handle of the gun where it goes into a large loop toward the electrode feeding machine. This top-heavy condition necessitates a very tight and, hence, a very tiring grip on the handle of the gun to prevent sway so that the arc can be accurately directed along the course of welding. In contrast, with gooseneck type guns there is no such top-heavy condition because nothing extends above the handle of the gun. Everything required to carry out the welding operation passes through the handle. Therefore, the handle cradles in the hand of the welding operator.

The main object of this invention is, therefore, to provide a gooseneck type arc welding gun which has a gooseneck formation with a large radius at the upstream end within which an inch or so of the electrode is curved into a large size radius; then, in the following section a smaller size radius within which the electrode is further curved into a smaller size radius; then, a section with a still smaller size radius within which the electrode is curved into a still smaller size radius; and finally, a section within which the electrode is curved into a still smaller size radius which is of the size required for making efficient electrical contact within the bore of the welding current contact tip.

The above primary object yields the following three secondary objects, namely: (1) a starting curvature through which the electrode can be easily pushed; (2) a gooseneck formation within which the electrode is progressively curved throughout the total length of the curvature so that the load required to push the electrode through the total curvature is distributed throughout the total length and not within the first few degrees of the curvature; and (3) distribution of the feed load throughout the total length of the curved formation with the result that the power required at the feed rolls is reduced to no more than has been required heretofore to feed the smaller sizes of electrode.

These and other objects, features, and advantages of this invention will be better understood by reference to the following detailed description in conjunction with the accompanying drawing.

Referring now to the single figure, there is illustrated in cross-sectional and diagrammatic representation a gooseneck type arc welding gun which embodies the gooseneck formation of this invention. The arc welding gun consists of a handle portion 10 in the form of a tube composed of vulcanized fiber or other suitable material which has electrical insulating properties and attached by suitable means (not shown) to the tubular portion 13 forming the main trunk member of the gun commonly called the gooseneck. A head assembly 14 is connected to the gooseneck 13 at the downstream end of the gun by a threaded head member 15, as shown, or by any other suitable means. The head assembly 14 includes a welding current contact tip 16 attached to the head member 15 by a threaded connection or other means. An insulating sheath 12 and a gas nozzle 17 are also shown carried on the head member 15.

Within the handle portion 10 of the arc welding gun, the gooseneck 13 has a straight bore section 21 provided with a threaded fitting 18 for attaching a welding cable 19. The consumable type arc welding electrode 20 emerges from the welding cable 19, passes through the gooseneck 13, through the head member 15, and out through the welding current contact tip 16.

The gooseneck type gun illustrated may be made for depositing all sizes of electrode from 0.025 inch diameter up to 3/16 inch diameter and larger. By changing the dimensions and proportions to suit, three different sizes of guns may be provided to handle this complete range of electrode sizes. In the following discussion, however, the gun will be described by way of example in a size used for depositing 1/8 inch diameter electrode.

It should be noted that the curvature of the gooseneck 13 is divided into four arcuate sections identified by reference numerals 1, 2, 3, and 4, with section 1 between radial lines 5 and 6, section 2 between radial lines 6 and 7, section 3 between radial lines 7 and 8, and section 4 between radial lines 8 and 9. The radius of curvature of the section 1, as measured from a center A on the radial line 5 drawn perpendicular to the preceding straight bore section 21 of the gooseneck, is approximately 7 inches. The radius of curvature of the section 2, as measured from a center B on the radial line 6, is approximately 6 inches. The radius of curvature of the section 3, as measured from a center C on the radial line 7, is appproximately 5 inches. The radius of curvature of the section 4, as measured from a center D on the radial line 8, is approximately 4 inches. Thus, an initial arcuate section 1 is provided into which the 1/8 inch diameter electrode 20 can be fed with a minimum amount of feed roll traction. The electrode 20 is precurved in the first arcuate section 1 for easy entry into the next arcuate section 2, and in section 2 the electrode 20 is further precurved for easy entry into section 3. In the arcuate section 3, the electrode 20 is still further precurved for easy entry into the final arcuate section 4 which has a radius of curvature of only 4 inches. From section 4, the electrode 20 is pushed into the straight bore 21 of the welding current contact tip 16. The arcuate length of section 1 may be approximately an inch, with each succeeding arcuate section being slightly longer than the preceding section such that the total angular extent of the curved portion of the gooseneck 13 is approximately 60° (i.e. the angle which would be formed by the intersection of the radial lines 5 and 9 is approximately 60°).

It should be understood that the arcuate lengths of the different sections, as well as the radii of curvature of the different sections, need not be exact. In fact, it is quite impractical to bend a straight copper tube into a gooseneck formation which has sections which have exact arcuate lengths and radii. Even if this were possible, it is not necessary because the object of this invention is to form the straight tube into a gooseneck formation which has a large radius of curvature at the upstream end and a small radius of curvature at the downstream end with the radii of curvature gradually reducing and blending between the large radius to the small radius.

The total angular extent of the gooseneck formation need not be 60°, but rather can be any angle between 30° to 90° because there are certain applications to which a gooseneck formation of an angular extent other than 60° is better suited.

It is important enough to mention here again that, due to the residual resiliency of hard drawn electrode, as the electrode leaves the curvature of a gooseneck formation, the curved radius of the electrode is not the radius of the gooseneck formation; it is considerably more. In fact, a very hard drawn 1/8 inch diameter electrode pushed through a 7 inch radius gooseneck springs back to a very large radius of curvature which prevents efficient welding current contact from being made between the surface of the fast moving electrode and the welding current contact tip as the electrode is fed through the straight bore of the welding current contact tip. To enable forming the electrode to a sufficient radius of curvature without unduly impeding passage of the electrode, it has been found in accordance with the present invention that the radius of curvature at the upstream end of the curved portion of the gooseneck should be larger than the radius of curvature at the downstream end by at least a factor of 1½ with the intermediate radii of curvature progressively diminishing.

While the embodiment described herein is at present considered to be preferred, it is understood that various modifications and improvements may be made therein, and it is intended to cover in the appended claims all such modifications and improvements as fall within the true spirit and scope of the invention.

What is claimed is:

1. In an arc welding gun having a handle portion and a head assembly containing a welding current contact tip through which continuous electrode is passed to the welding operation, a tubular gooseneck comprising a straight bore section extending from within the handle portion of the arc welding gun for receiving continuous electrode from a welding cable and a curved section for conducting the continuous electrode from said straight bore section to the head assembly for application to the welding arc, said curved section being defined by at least three finite radii of curvature which progressively diminish from the upstream end of said curved section to the downstream end thereof to gradually increase the curvature of the continuous electrode as the continuous electrode is passed through said curved section, the radius of curvature at the down stream end of said curved section being selected to form the continuous electrode to a curvature sufficient to provide firm sliding contact between the continuous electrode and the welding current contact tip as the continuous electrode is passed through the welding current contact tip, the angular extent of said curved section being not more than 90 degrees and not less than 30 degrees.

2. In an arc welding gun having a handle portion and a head assembly, a tubular gooseneck comprising a straight bore section extending from within the handle portion of the arc welding gun for receiving continuous electrode from a welding cable and a curved section for conducting the continuous electrode from said straight bore section to the head assembly for application to the welding arc, said curved section being defined by radii of curvature which progressively diminish from the upstream end of said curved section to the downstream end thereof, wherein the radius of curvature of said curved section at its upstream end is at least 1½ times the radius of curvature at its downstream end.

3. The improvement defined by claim 2 wherein the angular extent of said curved section is not more than 90 degrees and not less than 30 degrees.

4. The improvement defined by claim 3 wherein the angular extent of said curved section is approximately 60 degrees.

5. In an arc welding gun of the type having a tubular gooseneck for receiving and conducting continuous electrode to a head assembly containing a welding current contact tip through which the continuous electrode is passed for application to the welding arc, the improvement comprising a tubular gooseneck having a curved portion defined by at least three finite radii of curvature which progressively diminish from the upstream end of said curved portion to the downstream end thereof to gradually increase the curvature of the continuous electrode as the continuous electrode is passed through said curved section, the radius of curvature at the down stream end of said curved section being selected to form the continuous electrode to a curvature sufficient to provide firm sliding contact between the continuous electrode and the welding current contact tip as the continuous electrode is passed through the welding current contact tip, the angular extent of said curved section being not more than 90 degrees and not less than 30 degrees.

References Cited

UNITED STATES PATENTS

| | | | |
|---|---|---|---|
| 3,155,811 | 11/1964 | Adamson et al. | 219—130 |
| 2,797,306 | 6/1957 | Qualey | 219—130 |
| 2,960,598 | 11/1960 | Verhaeghe et al. | 219—130 |
| 3,089,022 | 5/1963 | Kinney | 219—130 |

JOSEPH V. TRUHE, Primary Examiner

C. L. ALBRITTON, Assistant Examiner

U.S. Cl. X.R.

226—196; 228—41